United States Patent [19]

Jaubert

[11] Patent Number: 4,757,576
[45] Date of Patent: Jul. 19, 1988

[54] FASTENING DEVICE FOR SPLICING BELTS

[75] Inventor: Claude Jaubert, Rueil Malmaison, France

[73] Assignee: Caoutchouc Manufacture et Plastiques, Malmaison, France

[21] Appl. No.: 924,775

[22] Filed: Oct. 30, 1986

[30] Foreign Application Priority Data

Oct. 30, 1985 [FR] France ................................. 8516102

[51] Int. Cl.$^4$ .............................................. F16G 3/00
[52] U.S. Cl. .................................. 24/31 R; 24/31 F; 24/37; 24/38; 29/525.1; 198/844
[58] Field of Search ............. 29/526 R; 198/844, 846, 198/847; 474/218, 253, 255, 256, 257; 24/31 R, 31 F, 31 W, 37, 38, 31 L

[56] References Cited

U.S. PATENT DOCUMENTS

| 4,489,827 | 12/1984 | Anderson | 198/844 |
| 4,540,389 | 9/1985 | Ramsey | 24/37 |

FOREIGN PATENT DOCUMENTS

| 2231322 | 1/1974 | Fed. Rep. of Germany | 24/37 |
| 2341992 | 3/1975 | Fed. Rep. of Germany | 24/37 |
| 2356072 | 5/1975 | Fed. Rep. of Germany | 24/31 R |
| 3425774 | 1/1986 | Fed. Rep. of Germany | 198/844 |
| 322536 | 12/1929 | United Kingdom | 24/37 |

Primary Examiner—Mark Rosenbaum
Assistant Examiner—Frances Chin
Attorney, Agent, or Firm—Antonelli, Terry & Wands

[57] ABSTRACT

A fastening device for splicing belts which include reinforcement elements fashioned of a synthetic textile or metal cord. The fastening device includes two lateral plates provided, in lower areas thereof, with retainer irons, and two intermediate plates which are provided, at an upper portion thereof, with an end zone of a rounded shape. The lower part of the intermediate plates is fashioned into an arc of a circle and provided with a stop which, when the belt is in use, will contact the retainer irons. A central plate is also provided which includes, at a base thereof a zone having a curvilinear triangular cross-sectional configuration, with the two lateral plates, two intermediate plates, and central plates and the belt being held by transversely extending bolts and, with the device acting as a cord clamp.

4 Claims, 4 Drawing Sheets

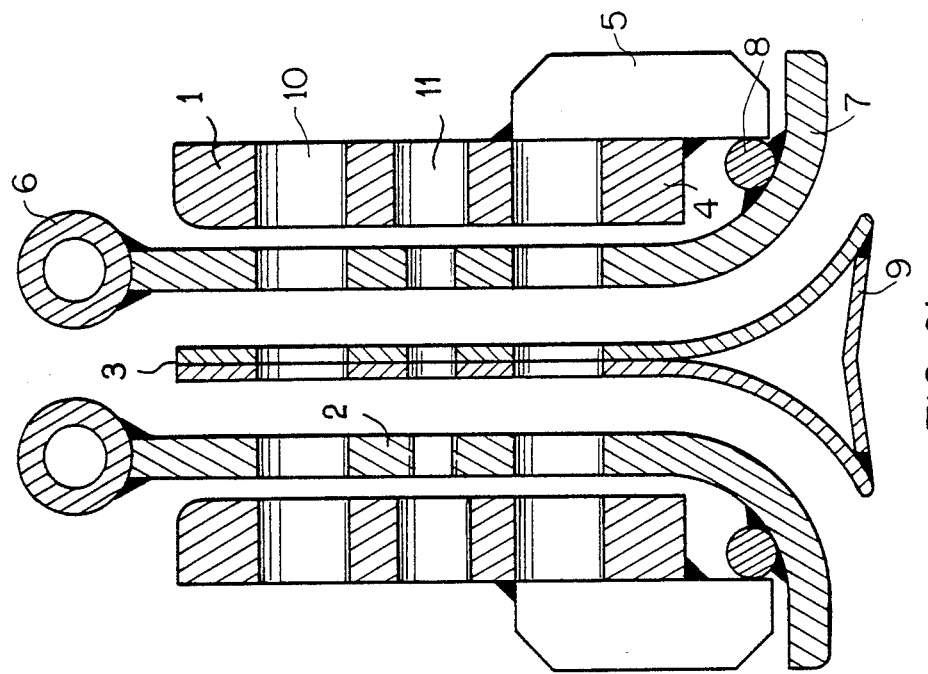
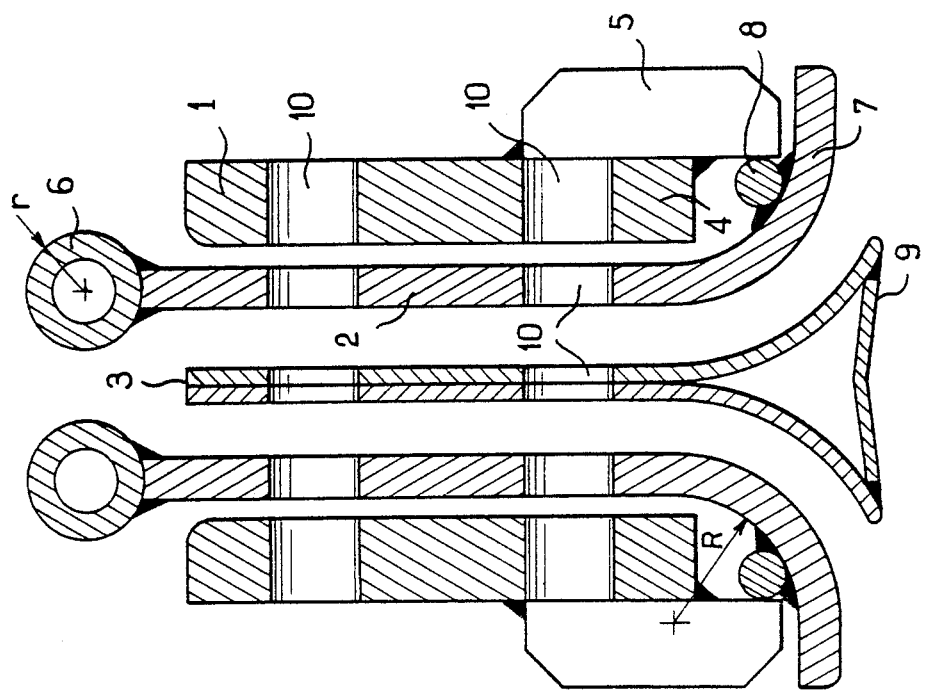

FASTENING DEVICE FOR SPLICING BELTS

BACKGROUND OF THE INVENTION

The present invention relates to belts or straps such as, for example, elevator conveyor belts and, more particularly, to a method and device for splicing the ends of belts to either increase their length or to make the belts endless by joining the belt to itself in a manner which is reliable during operation and, while the device and process are described below for application to an elevator belt, it is understood that the device and process are not limited to this use.

One conventional method of splicing the ends of belts is hot splicing after the ends of the reinforcement material have been interlaced. Various forms of these hot splicing techniques are described in a number of patents, such as DE No. 1,165,354; FR No. 74.03141 and DE No. 907,996; FR Nos. 1,395,634, 1,582,190 and 1,440,605; and U.S. Pat. No. 173,686. One method is recommended in German standard DIN 22131. Another method is described in a paper entitled "Factors relating to vulcanized splice reliability for steel cord reinforced conveyor belting", Gozdeff, delivered to the 125th Meeting of the Rubber Division, American Chemical Society, in Indianapolis on May 8-11, 1984. Finally, an article entitled "A survey of present-day conveyor belt technology", H. P. Lachmann published in *Bulk Solids Handling* volume 4, number 4, December 1984, reviews the different technologies that can be used.

Examples of prior art hot splicing are illustrated in FIG. 1. There are however, conditions which make hot splicing techniques inapplicable such as for example, the length of a splice may be incompatible with the space available in the sheath or alongside the elevator, or again the mechanical strength may become insufficient to guarantee trouble-free operation of the elevator if the temperature of the products transported or that of the gases circulating in the sheath is greater than 100° C.

Specifically, in the case of interlacing of metal cords, the two ends of the belt(s) are bonded together by the rubber mixture separating the ends of the cord(s). It is known, however, that as the temperature increases, the mechanical properties of elastomer-based mixtures decrease; the same applies to the bonding forces between the rubber and the metal and, consequently, the tensile strength of such a splice decreases as the temperature rises.

Taking into account the risks encountered with a splice using hot adhesion and interlacing of metal cords, handling engineers have suggested replacing the adhesive bond with a mechanical bond designed to clamp the two ends of the belts(s) against one another. These techniques are referred to as "clip fastening", and are described in, for example, French Pat. No. 1,320,222 of as well as in advertising materials of specialized companies such as Goro or Flexco.

The compression force is exerted by metal flanges which are passed through by clamping bolts. The principle applied in mechanically splicing the ends of a belt or belts is theoretically more satisfactory than the hot-adhesion process, but an analysis of phenomena associated with operation of this type of device shows that there is only a slight improvement in operating reliability. This is because the lateral plates have a tendency to move away from one another as a result of the tensile force exerted on the two ends of the belt. To remedy this problem, two lines of bolts are generally used to clamp the plates, with the line of bolts placed closest to the tension zone being designed to limit movement of the plates.

FIG. 2, referring to the prior art in clip fastening techniques, explains the changes which occur during operation, in terms of distribution of pressure over the belt ends.

When the clip fastener is initially clamped, pressure is distributed uniformly over the entire extent of the two clamped ends. When operation begins, the lateral parts are displaced, which tends to decrease the pressure in zone X and increase that in zone Y. As a result of the increased pressure, the rubber mixture located in zone Y tends to be expelled and to flow, i.e. rubber is displaced from the most highly compressed zones towards those least compressed. The effect of this flow is to encourage the clamping plates to move closer together in zone Y, which accentuates the effect.

As confirmation of this analysis, it is commonly observed that the second line of bolts has completely loosened, which proves that the pressure effect exerted on the ends of the belt(s) is due not to the bolts but to a rotary movement of the clamping plates. Since the clamping force in zone X has decreased considerably, the strength of such a clip fastener consists only of the retention of the metal cords in zone Y and the frictional forces existing in zone X between the belt and each of the clamping plates. When zone Y is unclamped, an examination of the ends of the belt(s) in said zone shows that the tensile stress has been so high that there has been local destruction of the rubber mixture and of the bond between the rubber and the metal cords. This fact makes the strength of such a clip fastener very problematical, especially when this mechanical effect is combined with the effect of temperature, since it is well known that increased temperature accelerates and facilitates the flow of elastomer-based mixtures, and decreases the strength of the bond between said mixtures and steel cords.

To remedy this problem, it is possible to attempt to increase the pressure exerted by the lateral plates by locking the ends of the metal cords.

In, for example, Pat. DE No. 2,341,992 a solution, is proposed wherein each metal cord is stripped at its end of its rubber covering, and the end is inserted into a vise clamping device, Such a technique, time-consuming and difficult to implement, presents a further risk due to the design of the metal cord clamping zone and, if the clamping pressure is not properly controlled, there is a certain risk of cutting the metal cord, which would nullify the anticipated effect. In addition, the screws have a tendency to loosen under the action of vibration and temperature, and therefore require constant monitoring.

A different solution, used in particular to lock pretensioning cables in prestressed structures, involves stripping the ends of the metal cables, unstranding them, i.e. untwisting the constituent strands to spread out the end, and pouring around it a metal with a low melting point. This technique is highly reliable when it can be used, but pouring the molten requires that the clip fastener be placed in a vertical position, which implies either that one of the drums of the elevator can be moved, which is not always possible, or that the clip fastener can be placed at the top of the elevator, although pouring molten metal onto the ends of metal cables at a height of several dozen meters is tricky and even dangerous. In addition, such a device is practically non-removable, which does not facilitate maintenance of the elevator or replacement of the belt.

The aim underlying the invention, essentially resides in providing a fastening device for splicing a belt or belts, and more particularly belts which comprise reinforcement elements made of synthetic textiles or metal cords.

Other objects of the invention are the process of making splices using the device described, and application to a conveyor belt for a bucket elevator.

By virtue of the fastening device of the invention, it is possible to create, using a method that is as simple as conventional splices and is completely safe since there is no handling of hot products or adhesives or heating equipment, a splice between two adjacent ends oof two belts to produce a longer belt, or between the two ends of a single belt to produce an "endless" item ready for operation on a conveyor or elevator.

The device, of the present invention which requires only simple preparation of the ends of the belt(s) to be assembled, acts on the principle of a cable clamp by immobilizing the ends by a loop made around an upper rounded part of an intermediate plate of the fastening device, and by simple mechanical clamping of the belt reinforcement elements over the longest possible length and in a zone where the reinforcement elements are stripped of rubber to limit the risks of flow and the effects of tension and temperature.

Specifically, the fastening device of the invention comprises two lateral plates equipped with retainer irons as well as two intermediate plates having on their upper part a zone for winding the belt without folding or damaging the belt in order to form a loop and a lower part of which, in the form of an arc of a circle, facilitates winding of the belt under tension. A stop is provided against which the retainer iron is pressed during operation, and a central plate is also provided. The fastening device acts by simple mechanical clamping of the belt by the various component parts of the fastening device due to a provision of transversely extending bolts.

The above and other objects, features, and advantages of the present invention will become more apparent from the following description when taken in connection with the accompanying drawings which show, for the purpose of illustration only, several embodiments in accordance with the present invention.

BRIEF DESCRIPTION OF THE DRAWINGS

FIGS. 3a–3b are cross sectional exploded views of a fastening device constructed in accordance with the present invention for splicing belts or forming an endless belt;

DETAILED DESCRIPTION

Figure 1A:
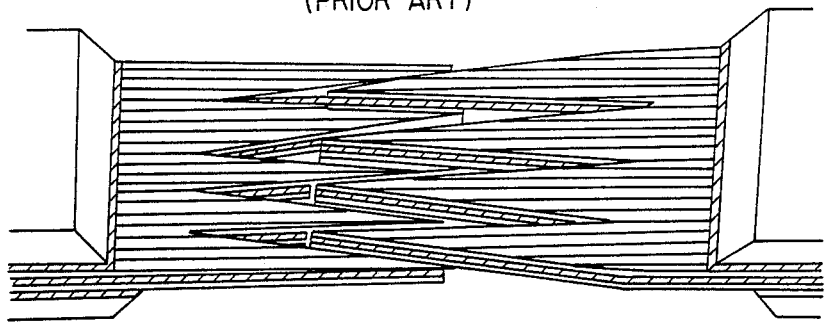
FIGS. 1A–1D are schematic views of a hot splicing for a belt or strap in accordance with the prior art.
Figure 1B:
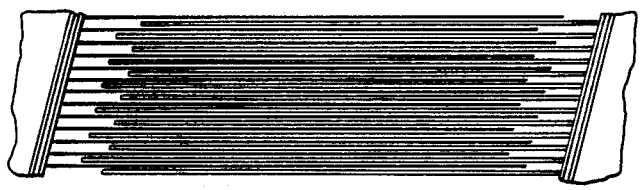
Figure 1C:
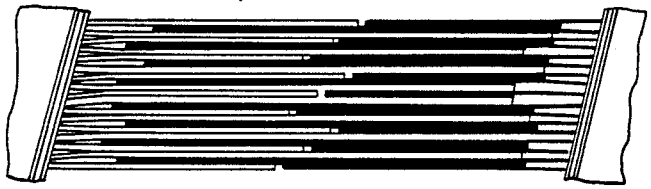
Figure 1D:
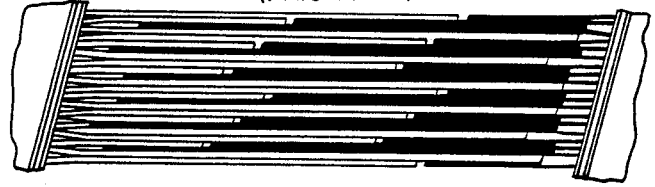
Figure 2:
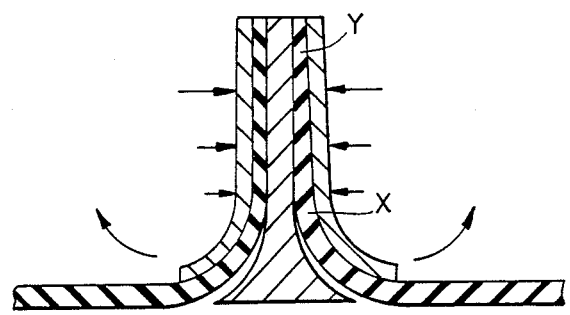
FIG. 2 is a cross-sectional view of a prior art clip fastener.

Referring now to the drawings wherein like reference numerals are used throughout the various views to designate like parts and, more particularly, to FIGS. 3a, 3b, according to these figures, two lateral plates 1 include at lower ends 4 thereof spaced bending retaining irons 5. Intermediate plates 2 are provided which comprise two end zones 6, 7 which are functional in shape in order to enable the ends of the belt or belts being assembled to be wound without excessive stress around the end zones 6. The end zones 6 have a sufficiently large radius of curvature r. The minimum value of the radius of curvature r is not critical when the fastening device is used with a textile-reinforced belt which is fairly flexible, but in cases where it is used with a belt reinforced with metal cords, the value of the radius of curvature r must be equal to at least five times a diameter of the metal cords. The end 7 of the intermediate plates 2 is shaped as an arc of a circle having a radius R to allow the tight belt to be wound without the risk of damage and, on a surface facing the lateral plate 1, the end 7 includes a stop 8 which, for example, is welded with the retainer iron 5 being adapted to be pressed against the stop 8 by a clamping action. The central plate comprises, at a base thereof, a zone 9 having a curvilinear triangular cross-sectional configuration, known in the art, constructed so as to separate the two ends of the belt and prevent, due to the enlarged base, an occurrence of impacts as the splice passes over rollers or drums (now shown).

In FIG. 3a, the lateral plate 1, intermediate plate 2 and central plate 3 are perforated with two rows of holes 10 to allow the passage of transverse bolts designed to clamp the various component elements of the fastening device and of the belt itself.

FIG. 3b shows an improvement to the fastening device which comprises, in addition to the elements described above, a hole 11 which has no clamping function but is designed to facilitate installation and centering of the lateral, intermediate and central plates 1, 2, 3 and of the belt during the fastening operation.

By virtue of the features of the fastening device of the present invention, a number of advantages are realized. More particularly, the fastening device is easy to implement with no need for tight tolerances between the folding radii of the metal sheets and the holes, and it is also possible to reduce the number of welds which means there is less risk of a deformation, shorter manufacturing time, and, consequently, lower manufacturing costs. Furthermore, the weight of the fastening device is reduced by approximately ten kilos per meter of length as compared to a heavy-duty clip fastener thereby making it possible to improve the overall energy consumption of a conveyor, and installation is greatly facilitated in the embodiment of FIG. 3b by virtue of the presence of the hole 11 for centering and guiding elements of the fastening device.

Figure 4B:
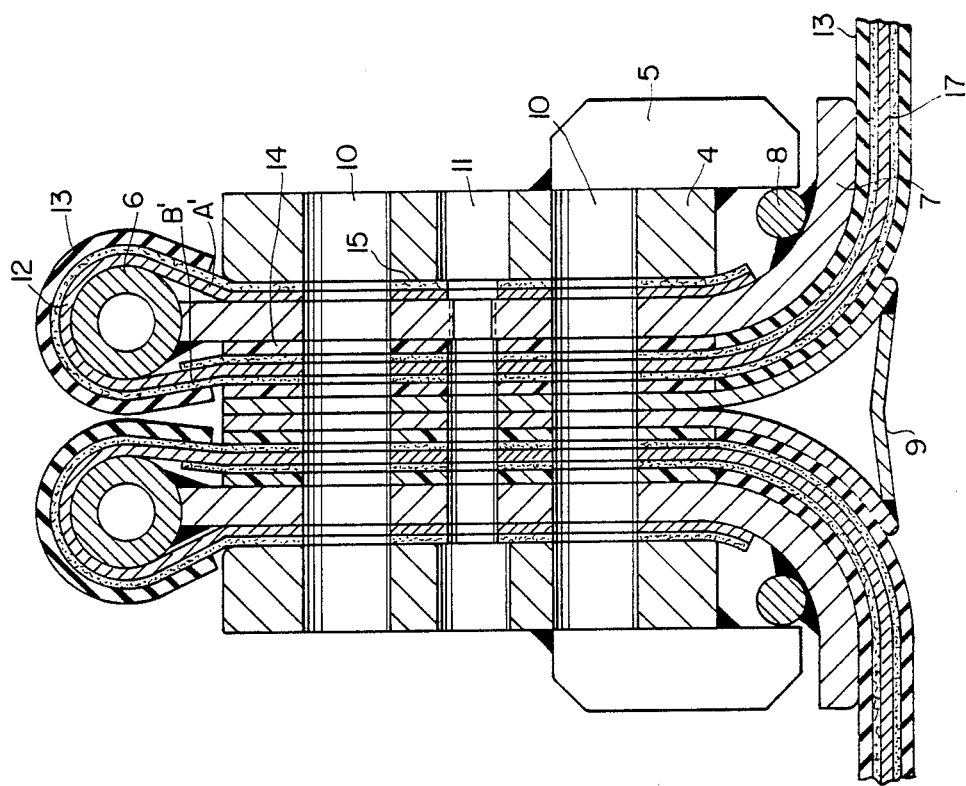
FIGS. 4a–4b are cross sectional views illustrating a splicing process employing a fastening device in accordance with the present invention.
Figure 4A:
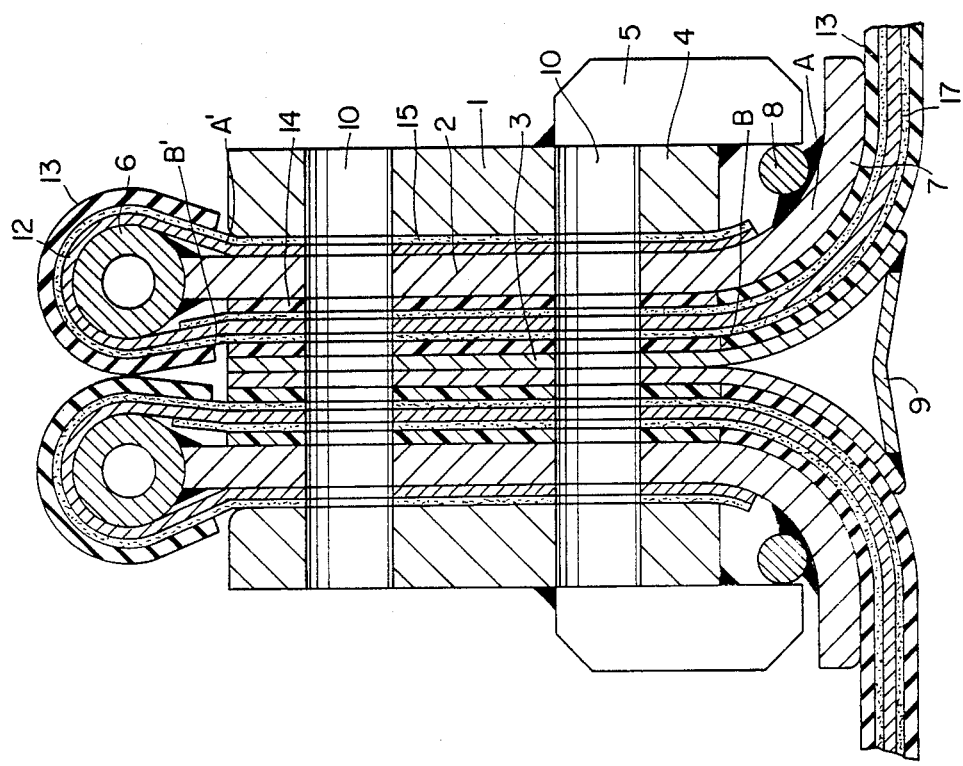

In the arrangement of FIGS. 4a, 4b, the splicing, made with the fastening devices 3a, 3b, respectively, requires a reinforcement element 12 to be stripped of the rubber coating 13 in zones A, A' and B, B' corresponding to the straight lengths of the lateral, intermediate, and central plates 1, 2, 3 of the fastening device, but they can retain their textile or metal wefts 17, if the belt is so provided, which act as a protection.

The lengths A'B', corresponding to the winding around the end plates 6 of the intermediate zones 2, retain their covering 13 for protection. Splicing is carried out by immobilizing the reinforcement elements 12, after turning them back in the form of a loop around the end zones 6 of the intermediate plates 2, then clamping the stripped zones of the reinforcement elements AA' and BB' between the lateral and intermediate plates 1, 2 and intermediate and central plates 2 3, by transverse bolts (not shown). The rubber coatings of the belt are therefore eliminated in the clamping zones AA' and BB', to minimize flow. The retainer irons 5 on the lateral plates 1 are then pressed against the stops 8 on the intermediate plates 2.

It is necessary to maintain a constant thickness between the lateral, intermediate and central plates 1, 2, 3 of the fastening device. To do so, the parts of the rubber covering which were eliminated are replaced with adjustment elements 14 having a thickness essentially equal to that of the rubber covering 13.

An arrangement such as proposed in FIGS. 4a, 4b has a number of advantages, namely, equal tension on the reinforcement elements or equal distribution of the tensile stresses over all of said reinforcement elements 12 thereby making it possible to obtain an average rupture strength which is greater than that obtained with conventional clip fastening devices. Moreover, a very simple preparation of the zones A, A' and B, B' is possible since it is limited to "peeling" that is, eliminating the rubber coverings, and piercing and requires very little time as compared with the usual preparation procedures and also demands no particular qualification on the part of the operator or use of complicated tools.

Furthermore, the process of adhering the ends of the belt is eliminated thereby resulting in also eliminating equipment such as, for example, a vulcanization press, molding parts, or build-up devices. Additionally, in service maintenance problems are reduced since the rubber flow in the clamping zones is low and a definitive clamping is achieved in a rapid manner with a re-clamping operation being less frequent. Moreover, the reliability of the splice is increased since variations in the components in the compressed parts are reduced and the splice retains its initial qualities over time and under difficult service conditions.

It is possible to protect the zones AA' and BB' against corrosion, dust contamination, chemical attack and wear due to contact between the lateral, intermediate and central plates 1, 2 and 3 of the fastening device by winding on a final sheet of rubber or textile.

Figure 5:
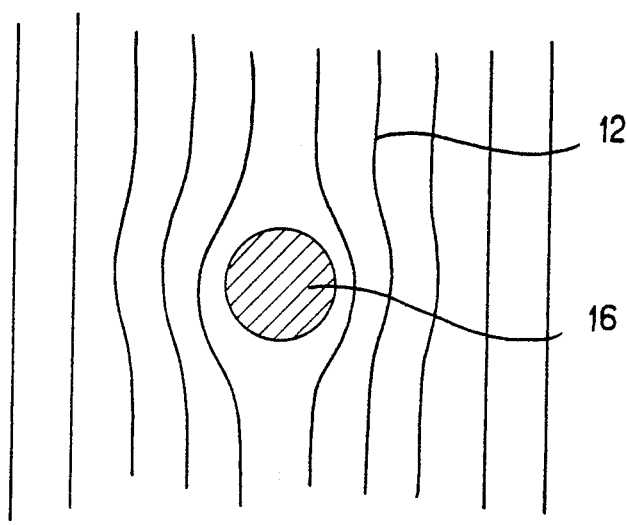
FIG. 5 is a schematic view illustrating a means for improving a quality of the splice in a device constructed in accordance with the present invention.

FIG. 5 shows a means of increasing the efficacy of the splice by limiting the number of cut reinforcement elements in the zone where the bolts pass through. To do so, it is possible, during installation, to arrange the reinforcement elements 12 in such a manner that they are diverted from their initial path around the shaft of the transverse bolts 16.

As mentioned previously, the reinforcement elements 12 are protected by a covering, but to increase this protection further, it is possible to place a cap on the upper part of the fastening device, most often made of sheet metal, and ensure complete watertightness by applying a putty or any other formable material.

To illustrate the efficacy of the splicing device which is the object of the invention, the following tests were conducted. Three identical belts, with a nominal strength of 1250 N/mm, were made into endless belts:
(1) with a standard commercial clip fastener acting only by clamping (belt 1);
(2) with the fastening device which is the object of the invention, in which passage of the transverse bolts leads to a certain number of cuts in the reinforcement elements (belt 2);
(3) with the fastening device which is the object of the invention, using the technique of diverting the reinforcement elements as diagrammed in FIG. 5 (belt 3).

The resulting spliced belts were mounted on a tensile-strength measurement bench consisting of two cylindrical drums with parallel axes.

By progressively moving the two drums apart, the tension exerted on the loop consisting of the endless belt is increased until the belt breaks, and the maximum applied force is recorded. The "efficiency" of the splice is defined as the ratio, in percent, of the maximum recorded force to the nominal strength of the belt. The results obtained are shown in the table below:

| Reference | Type of fastening | Efficiency |
| --- | --- | --- |
| Belt 1 | Commercial clip fastener | 51% |
| Belt 2 | Fastening device according to the invention | 63% |
| Belt 3 | Fastening device according to the invention + diversion of reinforcement elements in perforation zone | 77% |

This shows that the fastening system which is the object of the invention, which uses immobilization with mechanical clamping, makes it possible to create a splice in the ends of a belt or belts under simple conditions, similar to those of conventional clip fasteners, under safe conditions since there is no need to handle molten metal, and in such a way that the splice is reliable even under difficult utilization conditions such as high temperatures or high operating tensions. In addition, such a splice has advantages in economic terms.

While I have shown and described several embodiments in accordance with the present invention, it is understood that the same is not limited thereto but is susceptible of numerous changes and modifications as known to those skilled in the art and I do not wish to be limited to the details shown and described herein, but intend to cover all such modifications as are encompassed by the scope of the appended claims.

I claim:
1. Fastening device for splicing belts composed of a rubber covering and reinforcement elements made of at least one of synthetic textiles and metal cords, the fastening device comprising:
   two lateral plates, retainer irons provided in a lower zone of the two lateral plates;
   two intermediate plates having at an upper part thereof an end zone of a rounded shape allowing the belt to be wound without bending or breaking, and at a lower part thereof an end zone shaped as an arc of a circle a stop means provided at the lower part of the intermediate plates and adapted to contact the retainer irons for preventing deformation of the end zones of the intermediate plates;
   a central plate including at a base thereof a zone shaped as a curvilinear triangle designed to facilitate passage of splice over rollers, these plates and the belt being held by transversely extending bolts for clamping the plates and belts together by a clamping action bolts.

2. Fastening device for splicing belts according to claim 1, further comprising a hole in a vicinity of a central part of the lateral, intermediate and central plates, for facilitating an installation and a centering of the plates of the fastening device and the belt.

3. Fastening device for splicing belts according to one of claims 1 or 2, wherein, with a belt reinforced with metal cords, a radius of curvature of the end zones at the upper part of the intermediate plates is equal to at least five times a diameter of said metal cords.

4. Fastening device for splicing belts according to claim 1, further comprising a cap means provided on the upper part of the fastening device for protecting the fastening device against atmospheric contamination and the weather, and putty means for making the cap means watertight.

* * * * *